United States Patent [19]
Paranto et al.

[11] Patent Number: 5,621,514
[45] Date of Patent: Apr. 15, 1997

[54] RANDOM PULSE BURST RANGE-RESOLVED DOPPLER LASER RADAR

[75] Inventors: Joseph N. Paranto; Dean H. S. Liskow, both of Albuquerque, N.M.; Monica L. Minden, Calabasas, Calif.

[73] Assignee: Hughes Electronics, Los Angeles, Calif.

[21] Appl. No.: 369,023

[22] Filed: Jan. 5, 1995

[51] Int. Cl.⁶ .................. G01C 3/08; G01P 3/36; B60T 7/16
[52] U.S. Cl. .................. 356/5.09; 180/169; 356/28.5
[58] Field of Search .................. 356/5.09, 5.01, 356/28.5; 180/169

[56] References Cited

U.S. PATENT DOCUMENTS

| | | | |
|---|---|---|---|
| 3,795,447 | 3/1974 | Welch et al. | 356/28 |
| 4,167,329 | 9/1979 | Jelalian et al. | |
| 4,329,664 | 5/1982 | Javan. | |
| 4,856,893 | 8/1989 | Breen. | |
| 4,891,649 | 1/1990 | Labaar et al. | 342/203 |
| 5,267,011 | 11/1993 | Callender | 356/28.5 |

FOREIGN PATENT DOCUMENTS 6082554  3/1994  Japan .................. 356/5.09

*Primary Examiner*—Stephen C. Buczinski
*Attorney, Agent, or Firm*—Michael W. Sales; Wanda K. Denson-Low

[57] ABSTRACT

An laser radar system employing transmitted random and pseudo random optical pulse trains and signal processing that provides unambiguous range and Doppler velocity data. The system comprises a diode-pumped fiber laser local oscillator and an optical random pulse signal generator comprising a mode-locked fiber laser source for generating and transmitted randomly spaced optical pulses. A heterodyne output pulse monitor processes the local oscillator signals and samples the transmitted optical pulses. A heterodyne receiver detector processes the local oscillator signals and received optical pulses reflected from a target. An acoustic charge transport delay line provides a selectable signal delay for the signal provided by the heterodyne optical pulse monitor, and a mixer mixes signals provided by the heterodyne receiver detector and delay line and provides correlation output signals. A Doppler analyzer processes the correlation output signals from the mixer to provide frequency spectrum for each range bin, and an executive processor processes the frequency spectra from the Doppler analyzer to provide a range-resolved Doppler image on the display. The range-resolved Doppler output signals provided by the executive processor allow identification of a wideband weather signature and a narrow band target signature that are displayed on the display. The system employs a single waveform to provide the needed measurements, and eliminates trade-offs between range and velocity ambiguities. The present invention may be employed in vehicular collision avoidance radars and laser sensors, and in adaptive cruise control, robotic vision, and metrology-gauging applications.

9 Claims, 1 Drawing Sheet

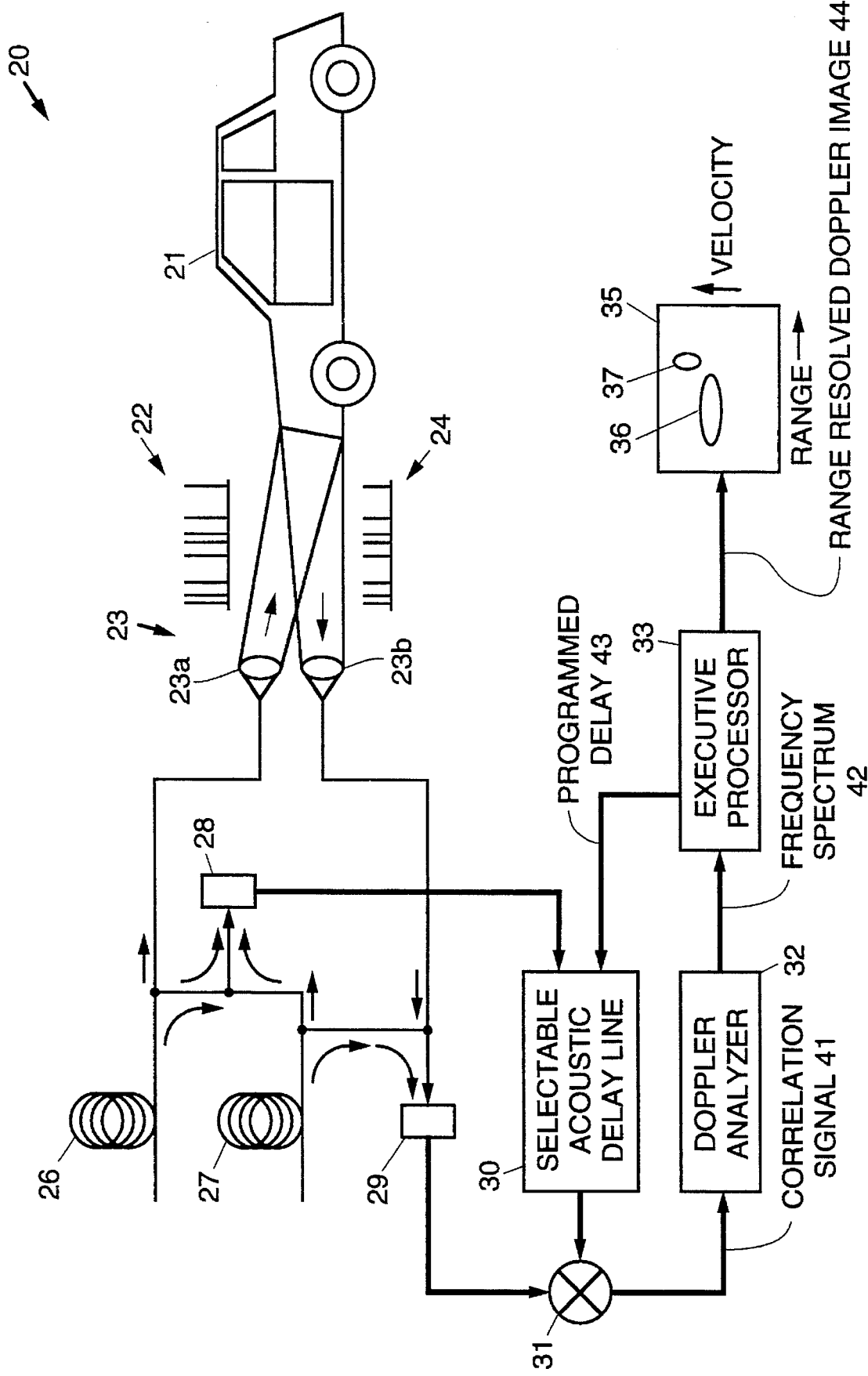

RANDOM PULSE BURST RANGE-RESOLVED DOPPLER LASER RADAR

BACKGROUND

The present invention relates to Doppler laser radar without ambiguities (ladar), and more particularly, to a random-pulse-burst range-resolved Doppler laser radar.

Presently developed vehicular anti-collision and adaptive cruise control radars are based upon either microwave sources or diode laser sources with direct detection receivers. Microwave sources are bulky, expensive and difficult to steer.

Diode laser sources are typically too incoherent to provide high resolution velocity or range rate information. Current ladars for military and defense applications employ waveforms that are ambiguous and require supplemental measurements to determine absolute range or velocity. Direct detection laser radars are prone to confusion from other weather related backscatter sources such as atmosphere, fog, rain and road spray, and to interference from laser radars in oncoming vehicles.

Therefore, it is an objective of the present invention to provide for an improved range-resolved Doppler ladar that overcomes the problems relating to conventional radars employed in anti-collision and adaptive cruise control systems and typical ladars employed in defense applications by using a random pulse burst waveform.

SUMMARY OF THE INVENTION

In order to meet the above and other objectives, the present invention is a laser radar (ladar) employing transmitted random and pseudo random optical pulse trains and signal processing matched to the waveform that provides unambiguous range and Doppler velocity data. More particularly, the present invention is a Doppler ladar system comprising a local oscillator, for providing heterodyne receiver signals, and an optical random pulse signal generator for generating and transmitting randomly spaced optical pulses. The present invention is a Doppler ladar system comprising a local oscillator for providing heterodyne receiver signals, and an optical random pulse signal generator for generating and transmitting randomly spaced optical pulses. The local oscillator and the optical random pulse signal generator may be embodied using diode pumped fiber lasers. A heterodyne output pulse monitor is coupled to the local oscillator and optical random pulse signal generator for sampling the transmitted optical pulses. A heterodyne receiver detector is coupled to the local oscillator and reflected optical pulses for sampling the target return signal. A selectable delay line is coupled to the heterodyne output pulse monitor for providing a selectable signal delay. An embodiment of the selectable delay line is the selectably tapped acoustic charge transport device. A mixer is coupled to the heterodyne receiver detector and to the selectable delay line for mixing signals received therefrom and for providing correlation output signals therefrom. A Doppler analyzer is coupled to the mixer output for processing the correlation signals to provide a frequency spectrum as a function of delay which corresponds to range. An executive processor is coupled to the Doppler analyzer out and to a display for processing the frequency spectra received therefrom to form a range-resolved Doppler image, and for displaying the range-resolved Doppler image. Each selectable delay represents a range to the target. The frequency spectrum obtained with each delay representing a column in the display and the sequential arrangement of these columns representing the range resolved Doppler image.

The present invention replaces bulkier and costlier power consuming microwave radars for use in vehicular anti-collision and adaptive cruise control applications. The present invention employs a single waveform to provide the needed measurements. The present invention eliminates trade-offs between range and velocity ambiguities. The present invention resolves tradeoffs between the requirement for high pulse rate frequency for Doppler sampling and low pulse rate frequency to avoid range ambiguities. Range ambiguity is the result of uniform periodic sampling and occurs for all sampling rates. The present invention implements a technique using a non-ambiguous ladar waveform to generate range-resolved Doppler imagery.

The present invention may be employed in vehicular collision avoidance radars and laser sensors. The present invention may also be used in adaptive cruise control, robotic vision, and metrology-guaging applications.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which, the sole drawing figure illustrates a random-pulse-burst range-resolved Doppler laser radar system in accordance with the principles of the present invention.

DETAILED DESCRIPTION

Referring to the drawing figure, it illustrates a random-pulse-burst range-resolved Doppler laser radar (ladar) system 20 in accordance with the principles of the present invention. The ladar system 20 includes a local oscillator 27 comprising a diode-pumped fiber laser, and an optical random laser pulse signal generator 26 comprising a mode-locked diode pumped fiber laser source 26. A heterodyne output pulse monitor 28 is provided to record the outgoing laser pulses 22 or waveform 22 in both temporal pulse spacing and optical phase.

Outgoing laser pulses 22 are transmitted by means of a beamshaping portion 23a of an optical system 23 and are reflected from a target 21, such as an automobile, for example. Reflected optical pulses 24 from the target 21 are collected by means of a receiving portion 23b of the optical system 23. The reflected optical pulses 24 ore mixed with output signals from the local oscillator 27 and processed by a heterodyne received detector 29.

The output of the heterodyne receiver detector 29 is coupled to one input of a mixer 31. An output of the heterodyne output pulse monitor 28 is coupled through a selectable delay line 30 comprising an acoustic charge transport (ACT) device that provides a selectable signal delay to a second input of the mixer 31. An output of the mixer 31 is the correlation signal 41 and is coupled through a Doppler analyzer 32 comprising an acousto-optic Bragg cell. The output of the Doppler analyzer is the frequency spectrum 42 which is coupled to the input of the executive processor 33.

The executive processor 33 coordinates the selectable delay line 30 using a programmed delay 43 to form a range-resolved Doppler image by displaying the Doppler analyzer output as columns for each range delay in the selectable delay line. This image can then be used for target tracking and identification, and is displayed in a range-resolved Doppler image display 35. The display 35 may be analyzed to distinguish various objects 36,37 in the scene based upon their range Doppler signatures. Weather creates a broad signature 36, which is distinct from the narrow signal of the moving target 37. An image 35 is generated for each spot at which the system 20 is pointed.

U.S. Pat. No. 4,633,285, filed Jan. 5, 1995, entitled "Passively Mode Locked Laser and Method for Generating a Pseudo Random Optical Pulse Train", assigned to the assignee of the present invention, details one diode pumped fiber laser source 26 that may be employed in the present ladar radar system 20 and describes the random or pseudo random optical pulse trains that are generated thereby. The present random-pulse-burst range-resolved Doppler ladar system 20 uses the pulse trains that ore generated by the diode-pumped fiber laser 26 without external control electronics to produce a practical ladar system 20.

Low signal to noise ratio in the presence of passive reflections from near objects or the natural environment presents a problem for conventional microwave radar systems. To reduce this problem microwave radars are designed to range and velocity measurements.

The present invention utilizes an optical wavelength in a ladar system to obtain resolution advantages while maintaining the capability of providing range and velocity measurements. It has been determined that the optimal reflection signature for coherent detection and discrimination is obtained by a transmitted random waveform. Such a waveform results in a "thumbtack" ambiguity detection function. The use of the optical random diode pumped pulse signal generator 26 comprising the fiber laser disclosed in the above-cited patent makes it possible to generate optical pulses with such an optimal random or pseudo-random transmission waveform without external control electronics. By employing a selectable delay line 30 comprising an acoustic charge transport (ACT) device, the signal processing, is performed in vend time.

In operation, the target 21 is illuminated my means of the optical system 23 by mode locked random pulses 22 generated by the fiber laser source 26, and reflected optical pulses 24 are detected by the heterodyne receiver detector 29. The heterodyne output pulse monitor 28 records the outgoing waveform 22. The local oscillator signal 27 is common to both heterodyne detectors 28, 29. The output of the heterodyne receiver detector 29 is electronically mixed with the output of the heterodyne optical pulse monitor 28 in the mixer 31 after being delayed by a selected amount of time delay in the selectable delay line 30 comprised of the ACT device.

The output signal derived from the mixer 31 corresponds to the correlation 41 of the two input signals, and is passed through the Doppler analyzer 32 to generate a frequency spectrum 42. The frequency spectrum 42 from the Doppler analyzer 32 is passed through the executive processor 33 which generates the range-resolved Doppler image 44. The image 44 is displayed on the image display 35 allowing separation of the wideband weather signature 36 from the narrow band target signature 37. Selection of the delay provided by the delay line 30 by means of a programmed delay 43 generated by the executive processor 33 determines the range bin. The Doppler analyzer 32 determines the velocity of the target 21. In this manner optical and electronic signal processing permits the use of an optimal random or pseudo-random pulse waveform and reduces or eliminates ladar signature ambiguity.

The optical random pulse signal generator 26 is a mode-locked laser that generates continuous pulses at random time intervals and can operate at 1.0 to 1.55 μm wavelengths. The waveform 22 provides short (nsec) pulses at random intervals and with random phase. The pulse widths provide the range resolution and the total coherent measurement time over which the laser is sampled is used to determine the Doppler velocity measurement. The random pulse intervals allow the absolute range to the target 21 to be determined.

The ladar system 20 of the present invention allows separation of weather and target through the unique Doppler signatures of each object. The target measurement is displayed as a single velocity and a single range. Weather scatter results in a spread of range and Doppler measurements. In this manner the target location is determined from its unique signature in the range resolved Doppler image 44.

Thus there has been described a new and improved random-pulse-burst range-resolved Doppler laser radar. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A range resolved Doppler ladar system comprising:

a laser local oscillator for providing local oscillator signals;

an optical random pulse signal generator for generating and transmitting randomly spaced waveforms;

a heterodyne output pulse monitor coupled to the local oscillator and signal generator for sampling the transmitted waveforms;

a heterodyne receiver detector coupled to the local oscillator and reflected waveforms received from a target;

a selectable delay line coupled to the heterodyne output pulse monitor for providing a selectable signal delay;

a mixer coupled to the heterodyne receiver detector and to the selectable delay line for mixing signals received therefrom and for providing correlation output signals therefrom;

a Doppler analyzer coupled to the mixer output for processing the correlation signals to provide a frequency spectrum;

a display; and an executive processor coupled to the Doppler analyzer and to the display for processing the frequency spectra received therefrom to form a range-resolved Doppler image, and for displaying the range-resolved Doppler image on the display.

2. The system of claim 1 wherein the laser local oscillator comprises a diode-pumped fiber laser local oscillator.

3. The system of claim 1 wherein the optical random pulse signal generator comprises a mode-locked fiber laser source.

4. The system of claim 1 wherein the delay line further comprises an acoustic charge transport device.

5. The system of claim 1 which further comprises:

an optical system coupled to the optical random pulse signal generator and to the heterodyne receiver detector for transmitting the optical pulses and for receiving the reflected optical pulses from the target.

6. The system of claim 1 wherein the frequency spectrum for each range bin provided by the executive processor corresponds to a weather signature and a narrow target signature that are displayed on the display.

7. A random-pulse-burst range-resolved Doppler ladar system for displaying a range-resolved Doppler image on a display, said system comprising:

a diode-pumped fiber laser local oscillator for providing local oscillator signals;

an optical random pulse signal generator comprising a mode-locked fiber laser source for generating and transmitting randomly spaced waveforms;

a heterodyne output pulse monitor coupled to the local oscillator and signal generator for sampling the transmitted waveforms;

a heterodyne receiver detector coupled to the local oscillator and reflected waveforms received from a target and for sampling the return waveform;

an acoustic charge transport delay line coupled to the heterodyne optical pulse monitor for providing a selectable signal delay;

a mixer coupled to the heterodyne receiver detector and to the acoustic charge transport delay line for mixing signals received therefrom and for providing correlation output signals therefrom;

a Doppler analyzer coupled to the mixer for processing the correlation output signals to provide frequency spectra; and an executive processor coupled to the Doppler analyzer and to the display for processing the frequency spectra to form a range-resolved Doppler image, and for displaying the range-resolved Doppler image on the display.

8. The system of claim 7 which further comprises:

an optical system coupled to the optical random pulse signal generator and to the heterodyne receiver detector for transmitting the outgoing pulses and for receiving the reflected waveforms from the target.

9. The system of claim 7 wherein the frequency position signals for each range bin provided by the executive processor correspond to a wideband weather signature and a narrow band target signature that are displayed on the display.

* * * * *